(12) United States Patent
Tong et al.

(10) Patent No.: US 12,365,356 B2
(45) Date of Patent: Jul. 22, 2025

(54) ADAPTIVE SIDE BLIND ZONE ALERT SYSTEM AND METHOD

(71) Applicant: GM Global Technology Operations LLC, Detroit, MI (US)

(72) Inventors: Wei Tong, Troy, MI (US); Xiaofeng Frank Song, Novi, MI (US); Shige Wang, Northville, MI (US); Shuqing Zeng, Sterling Heights, MI (US); Gopichand Movva, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 17/938,443

(22) Filed: Oct. 6, 2022

(65) Prior Publication Data

US 2024/0116527 A1  Apr. 11, 2024

(51) Int. Cl.

| | | |
|---|---|---|
| *B60W 50/14* | (2020.01) | |
| *B60Q 1/50* | (2006.01) | |
| *B60W 40/04* | (2006.01) | |
| *G08G 1/0967* | (2006.01) | |
| *H04W 4/44* | (2018.01) | |
| *H04W 4/46* | (2018.01) | |

(52) U.S. Cl.
CPC .......... *B60W 50/14* (2013.01); *B60Q 1/525* (2013.01); *B60W 40/04* (2013.01); *G08G 1/096783* (2013.01); *H04W 4/44* (2018.02); *H04W 4/46* (2018.02); *B60W 2420/54* (2013.01); *B60W 2556/45* (2020.02)

(58) Field of Classification Search
CPC .. B60W 50/14; B60W 40/04; B60W 2420/54; B60W 2556/45; B60W 30/0956; B60W 30/18163; B60W 30/18009; B60W 50/16; B60W 2050/143; B60W 2050/146; B60W 2552/53; B60W 2554/40; B60W 2556/65; B60Q 1/525; B60Q 9/008; G08G 1/096783; G08G 1/166; G08G 1/167; H04W 4/44; H04W 4/46
See application file for complete search history.

(56) References Cited

U.S. PATENT DOCUMENTS

| | | | | |
|---|---|---|---|---|
| 2019/0303688 | A1* | 10/2019 | Yang | ........... G06F 18/2413 |
| 2022/0348227 | A1* | 11/2022 | Foster | ........... B60Q 1/507 |
| 2023/0298268 | A1* | 9/2023 | Oleynikova | ........... G06T 1/20 |

\* cited by examiner

*Primary Examiner* — Jelani A Smith
*Assistant Examiner* — Paul A Castro
(74) *Attorney, Agent, or Firm* — Vivacqua Crane, PLLC

(57) ABSTRACT

A dynamic side blind zone method includes determining that a host vehicle is approaching a first lane that is nonparallel to a second lane. The host vehicle is moving in the second lane. The method further includes activating an adaptive side blind zone alert system of the host vehicle in response to determining that the host vehicle is approaching the first lane that is nonparallel to the second lane, determining a warning zone in response to activating the adaptive side blind zone alert system of the host vehicle, and detecting a remote vehicle inside the warning zone after determining the warning zone. The remote vehicle is moving in the first lane. The method further includes providing an alert to a vehicle user of the host vehicle in response to detecting that the remote vehicle is inside the warning zone.

18 Claims, 3 Drawing Sheets

ADAPTIVE SIDE BLIND ZONE ALERT SYSTEM AND METHOD

INTRODUCTION

The present disclosure relates to blind zone alerts and, more particularly, to adaptive side blind zone alert systems and methods.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, the side blind zone alert system defines a warning zone as a fixed area in the adjacent lane on each side of the host vehicle, wherein the adjacent lane is parallel to the lane where the host vehicle is located. Therefore, it is desirable to develop a side blind zone alert system that defines a warning zone even when the lane adjacent to the host vehicle is not parallel to the lane where the host vehicle is located.

SUMMARY

The present disclosure describes a dynamic or adaptive side blind zone method and system. In an aspect of the present disclosure, the method includes determining that a host vehicle is approaching a first lane that is nonparallel to a second lane. The host vehicle is moving in the second lane. The method further includes activating an adaptive side blind zone alert system of the host vehicle in response to determining that the host vehicle is approaching the first lane that is nonparallel to the second lane, determining a warning zone in response to activating the adaptive side blind zone alert system of the host vehicle, and detecting a remote vehicle inside the warning zone after determining the warning zone. The remote vehicle is moving in the first lane. The method further includes providing an alert in response to detecting that the remote vehicle is inside the warning zone. The method described in this paragraph improves vehicle technology by detecting dynamic objects, such as remote vehicles, driving on a lane adjacent to the host vehicle that is not parallel to the lane where the host vehicle is located.

In an aspect of the present disclosure, the method further includes determining a minimum distance from a center of gravity of the host vehicle to a centerline extending along a center of the first lane. The method may further include determining a width of the warning zone as a function of the minimum distance from the center of gravity of the host vehicle to the centerline extending along the center of the first lane and determining a length of the warning zone as a function of the width of the warning zone.

In an aspect of the present disclosure, determining the length of the warning zone as a function of the width of the warning zone includes determining the length of the warning zone using the following equation:

$$L = k \times w$$

where:
L is the length of the warning zone;
w is the width of the warning zone; and
k is a predetermined scaling factor.

In an aspect of the present disclosure, detecting the remote vehicle inside the warning zone includes using a blind zone sensor to detect the remote vehicle inside the warning zone. The blind zone sensor may be an ultrasonic sensor. The blind zone sensor has a maximum range. The length of the warning zone is equal to or less than the maximum range of the blind zone sensor. The width of the warning zone is equal to or less than the maximum range of the blind zone sensor. The length of the warning zone and the width of the warning zone are constrained by the following equation:

$$\sqrt{w^2 + L^2} \leq \gamma_{max}$$

where:
L is the length of the warning zone;
w is the width of the warning zone; and
$\gamma_{max}$ is the maximum range of the blind zone sensor.

In an aspect of the present disclosure, determining the warning zone as the function of the minimum distance from the center of gravity of the host vehicle to the centerline of the first lane includes calculating the width of the warning zone using the following equation:

$$w = \frac{d + \frac{1}{2}Veh_{width} + \frac{1}{2}lane_{width}}{\cos \alpha} + \delta$$

where:
$\delta$ is a predetermined constant to fine tune the width of the warning zone;
d is the minimum distance from the center of gravity of the host vehicle to the centerline extending along the center of the first lane;
$Veh_{width}$ is a width of the host vehicle;
$lane_{width}$ is a width of the second lane;
$\alpha$ is an angle from centerline extending along the center of the first lane and a centerline extending along a center of the second lane; and
w is the width of the warning zone.

In an aspect of the present disclosure, providing the alert includes turning on the light of the host vehicle.

In an aspect of the present disclosure, determining that the host vehicle is approaching the first lane that is nonparallel to the second lane includes: receiving location data of the host vehicle; receiving a navigation map of an area surrounding the host vehicle; and determining that the host vehicle is approaching the first lane that is nonparallel to the second lane using the location data of the host vehicle and the navigation map of the area surrounding the host vehicle.

In an aspect of the present disclosure, determining that the host vehicle is approaching the first lane that is nonparallel to the second lane includes: detecting a traffic pattern that is not parallel to a heading of the host vehicle; and determining that the host vehicle is approaching the first lane that is nonparallel to the second lane in response to detecting the traffic pattern that is not parallel to the heading of the host vehicle.

In an aspect of the present disclosure, determining that the host vehicle is approaching the first lane that is nonparallel to the second lane includes: receiving vehicle-to-vehicle (V2V) communication from the remote vehicle. The V2V communication is indicative that the host vehicle is approaching the first lane that is nonparallel to the second lane. The method further includes determining that the host vehicle is approaching the first lane that is nonparallel to the second lane in response receiving the V2V communication from the remote vehicle.

In an aspect of the present disclosure, determining that the host vehicle is approaching the first lane that is nonparallel to the second lane includes receiving vehicle-to-infrastructure (V2I) communication from an infrastructure. The V2I communication is indicative that the host vehicle is approaching the first lane that is nonparallel to the second lane. The method further includes determining that the host vehicle is approaching the first lane that is nonparallel to the second lane in response receiving the V2I communication from the remote vehicle.

The present disclosure also describes a tangible, non-transitory, machine-readable medium, including machine-readable instructions, that when executed by one or more processors, cause one or more processors to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
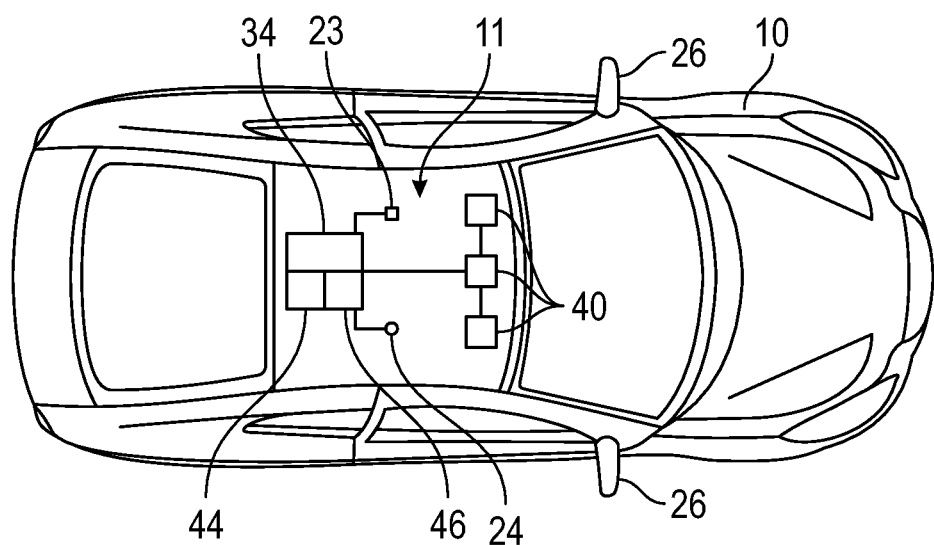
FIG. 1 is a schematic diagram of a host vehicle including an adaptive side blind zone alert system.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 includes (or is in communication with) an adaptive side blind zone alert system 11. While the system 11 is shown inside the host vehicle 10, it is contemplated that the system 11 may be outside of the host vehicle 10. As a non-limiting example, the system 11 may be a cloud-based system in wireless communication with the host vehicle 10. Although the host vehicle 10 is shown as a sedan, it is envisioned that that host vehicle 10 may be another type of vehicle, such as a pickup truck, a coupe, a sport utility vehicle (SUVs), a recreational vehicle (RVs), etc. Irrespective of the type of vehicle, the host vehicle 10 may be an autonomous vehicle configured to drive autonomously.

The system 11 includes a system controller 34 and one or more sensors 40 in communication with the system controller 34. The sensors 40 collect information and generate sensor data indicative of the collected information. As non-limiting examples, the sensors 40 may include Global Positioning System (GPS) transceivers or receivers, yaw rate sensors, speed sensors, lidars, radars, blind zone sensors (e.g., ultrasonic sensors), and cameras, among others. The GPS transceivers or receivers are configured to detect the location of the host vehicle 10 in the globe. The speed sensors are configured to detect the speed of the host vehicle 10. The yaw rate sensors are configured to determine the heading of the host vehicle 10. The cameras have a field of view large enough to capture images in front, in the rear, and in the sides of the host vehicle 10. The blind zone sensor (e.g., ultrasonic sensor) may detect a dynamic object, such as a remote vehicle 54, in a lane adjacent to the lane in which the host vehicle 10 is located.

The system controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the system controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the system controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the system controller 34 in controlling the host vehicle 10. The non-transitory computer readable storage device or media 46 may store map data and/or sensor data received from one of the sensors 40. The sensor data may include localization data received from the GPS transceiver. The map data includes a navigation map. The navigation map may include, but is not limited to, lane information, the lane width of lanes around the host vehicle 10, the location of lanes around the host vehicle 10, angles between merging lanes, the location of lane merges, etc.

Figure 3:
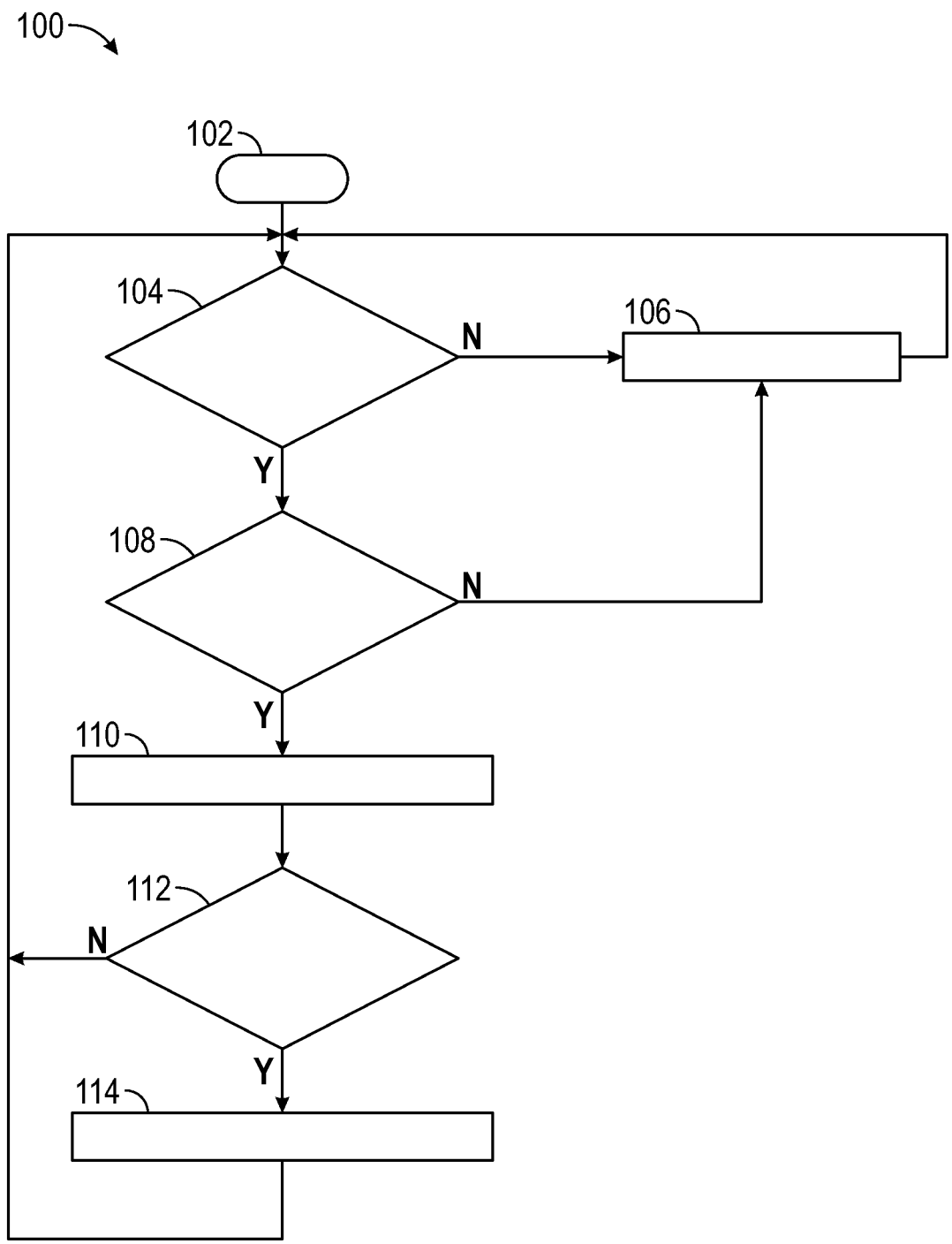
FIG. 3 is a flowchart of an adaptive side blind zone alert method.

The instructions may include one or more separate programs, each of which comprises an ordered listing of executable instructions for implementing logical functions. The instructions, when executed by the processor 44, receive and process signals from the sensors 40, perform logic, calculations, methods and/or algorithms for automatically controlling the components of the host vehicle 10, and generate control signals to the actuators to automatically control the components of the host vehicle 10 based on the logic, calculations, methods, and/or algorithms. Although a single system controller 34 is shown in FIG. 1, the system 11 may include a plurality of system controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the system controller 34 are embodied in the system 11. The non-transitory computer readable storage device or media 46 includes machine-readable instructions that when executed by the one or more processors 44, cause the processors 44 to execute the method 100 (FIG. 3).

The host vehicle 10 includes a user interface 23, which may be a touchscreen in the dashboard. The vehicle user interface 23 may include, but is not limited to, an alarm, such as one or more speakers to provide an audible sound, haptic feedback in a vehicle seat or other object, one or more displays, one or more microphones and/or other devices suitable to provide a notification to the vehicle user of the host vehicle 10. The user interface 23 is in electronic communication with the system controller 34 and is configured to receive inputs by a vehicle user (e.g., a vehicle user or a vehicle passenger). For example, the vehicle user interface 23 may include a touch screen and/or buttons configured to receive inputs from a vehicle user. Accordingly, the system controller 34 is configured to receive inputs from the vehicle user via the user interface 23. The user interface 23 may be used to enable and disable the adaptive side blind zone alert system 11.

The host vehicle 10 may additionally include one or more lights 24 in communication with the system controller 34. Accordingly, the lights 24 may receive signals (e.g., commands) from the system controller 34. For example, the system controller 34 may command the light 24 to turn off, turn on, or blink. In the present disclosure, the light 24 may provide a side blind zone alert to the vehicle user. Although shown separate from the user interface 23, the light 24 may be part of the user interface 23. Alternatively, or additionally, the lights 24 may be located in the side-view mirrors 26 of the host vehicle 10.

Figure 2:
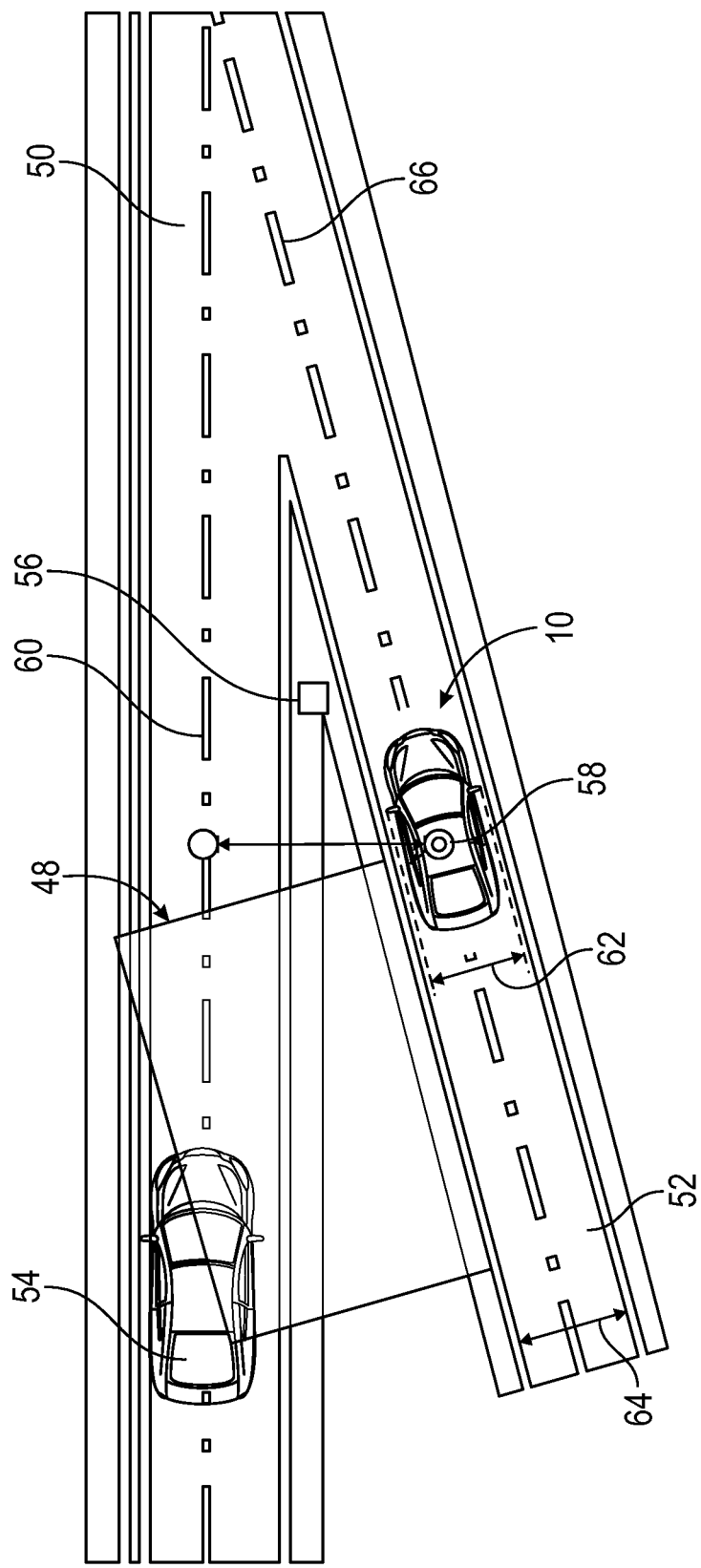
FIG. 2 is a schematic diagram of the host vehicle using the adaptive side blind zone alert system.

With reference to FIG. 2, the system 11 is programmed to dynamically adjust a side blind warning zone 48 to generate an alert (i.e., a warning) that can be generated when the host vehicle 10 is approaching a lane (i.e., the first lane 50) that is nonparallel to the lane (i.e., a second lane 52) where the host vehicle 10 is located. As a non-limiting example, this situation may occur when the host vehicle 10 is moving along a ramp (i.e., the second lane 52) and merging into a main road (i.e., the first lane 50). The dynamic adjustment may be triggered based on the location information from the navigation map, the detection of a dynamic object (e.g., remote vehicle 54) and/or other sources such as vehicle-to-vehicle (V2V) communications (e.g., data send by the remote vehicle 54 and received by host vehicle 10) and vehicle-to-infrastructure (V2I) communications (e.g., data sent from an infrastructure 56 and received by the host vehicle 10).

FIG. 3 is a flowchart of an adaptive side blind zone alert method 100. The method 100 begins at block 102. Then, the method 100 proceeds to block 104. At block 104. At block 104, the system controller 34 determines whether the adaptive side blind zone alert system 11 is enabled. If the adaptive side blind zone alert system 11 is not enabled, then the method 100 continues to block 106. At block 106, the system controller 34 uses a regular side blind zone alert system. If the adaptive side blind zone alert system 11 is enabled, then the method 100 continues to block 108.

At block 108, the system controller 34 determines whether the host vehicle 10, which is moving along the second lane 52, is approaching the first lane 50 that is nonparallel to the second lane 52. In other words, the system controller 34 determines whether the host vehicle 10 is within a predetermined distance from the first lane 50 that is not parallel to the second lane 52. The host vehicle 10 is moving in the second lane 52. To make this determination, the system controller 34 may retrieve the map data (which includes the navigation map) from a non-transitory computer readable storage device or media 46 and may receive location data (i.e., the location of the host vehicle 10 in the globe) from a GPS transceiver or receiver and analyze the map data and the location data to determine that the host vehicle 10 is approaching the first lane 50 (i.e., the lane that is not parallel to the second lane 52). Alternatively, or additionally, the system controller 34 may receive sensor data from the sensors 40 (e.g., lidar) to detect a traffic pattern that is not parallel to the heading of the host vehicle 10. The heading of the host vehicle 10 may be determined using one or more sensors 40, such as the yaw rate sensor. By determining the heading of the host vehicle 10 and detecting the traffic pattern that is not parallel to the heading of the host vehicle 10, the system controller 34 may determine that the host vehicle 10, which is moving along the second lane 52, is approaching the first lane 50, which is nonparallel to the second lane 52. Alternatively, or additionally, the host vehicle 10 may receive data from V2V communications and/or V2I communications. The data from V2V communications and/or V2I communications are indicative that the host vehicle 10, which is moving along the second lane 52, is approaching the first lane 50, which is nonparallel to the second lane 52. If the system controller 34 determines that the host vehicle 10, which is moving along the second lane 52, is not approaching the first lane 50 that is nonparallel to the second lane 52, then the method 100 returns to block 106. If the system controller 34 determines that the host vehicle 10, which is moving along the second lane 52, is approaching the first lane 50 (e.g., is within a predetermined distance from the first lane 50), which is nonparallel to the second lane 52, then the method 100 proceeds to block 110.

At block 110, the system controller 34 determines the side blind warning zone 48 (FIG. 2). As a non-limiting example, the warning zone 48 may be calculated using the following equations:

$$w = \frac{d + \frac{1}{2}Veh_{width} + \frac{1}{2}lane_{width}}{\cos \alpha} + \delta. \qquad \text{Eq. 1}$$

where:
$\delta$ is a predetermined constant to fine tune the width of the warning zone 48;
d is a minimum distance from the center of gravity 58 of the host vehicle 10 to the centerline 60 extending along the center of the first lane 50;
$Veh_{width}$ is the width 62 of the host vehicle 10;
$lane_{width}$ is the width 64 of the second lane 52;
$\alpha$ is an angle from the centerline 60 extending along the center of the first lane 50 and a centerline 66 extending along a center of the second lane 52; and
w is the width of the warning zone 48; and $$L = k \times w \qquad \text{Eq. 2}$$

where:
L is length of the warning zone 48;
w is the width of the warning zone 48; and
k is a predetermined scaling factor; and $$\sqrt{w^2 + L^2} \leq \gamma_{max} \qquad \text{Eq. 3}$$

$$w \leq \gamma_{max} \qquad \text{Eq. 4}$$

$$L \leq \gamma_{max} \qquad \text{Eq. 5}$$

where:

L is length of the warning zone 48;

w is the width of the warning zone 48; and $\gamma_{max}$ is the maximum range of the blind zone sensor (at least one of the sensors 40).

In light of the equations above, the system controller 34 determines all the variables mentioned above. Then, the system controller 34 determines the width w and the length L of the warning zone 48 using the variables mentioned above. The centerline 60 may be virtual. It is envisioned that the warning zone 48 may be determined in other ways. After block 110, the method 100 continues to block 112.

At block 112, the system controller 34 determines whether a dynamic object (e.g., the remote vehicle 54 in the first lane 50) is inside the warning zone 48 after determining the warning zone 48. In this case, the remote vehicle 54 is moving in the first lane 50. If the dynamic object (e.g., the remote vehicle 54) is not inside the warning zone 48, then the method 100 returns to block 104. If the dynamic object (e.g., the remote vehicle 54) is inside the warning zone 48, then the method 100 proceeds to block 114.

At block 114, the system controller 34 commands the user interface 23 and/or the light 24 to provide an alert to the vehicle user of the host vehicle 10. The alert is indicative that a dynamic object (e.g., the remote vehicle 54) is inside the warning zone 48. The color of the light 24 that turns on for the adaptive side blind zone alert system 11 may be different than the color of the light that turns on for the regular side blind zone alert system. For example, the light 24 that turns on for the adaptive side blind zone alert system 11 may be red, whereas the light that turns on for the regular side blind zone alert system may be orange. The light pattern that turns on for the adaptive side blind zone alert system 11 may be different that the light pattern that turns on for the regular blind zone alert system. For instance, a light may turn on steadily for the regular side blind zone alert system, whereas the light 24 may flash slowly for the for the adaptive side blind zone alert system 11. After block 114, the method 100 returns to block 104.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An adaptive side blind zone method, comprising:
   determining that a host vehicle is approaching a first lane that is nonparallel to a second lane, wherein the host vehicle is moving in the second lane;
   activating an adaptive side blind zone alert system of the host vehicle in response to determining that the host vehicle is approaching the first lane that is nonparallel to the second lane;

determining a minimum distance from a center of gravity of the host vehicle to a centerline extending along a center of the first lane;

determining a warning zone in response to activating the adaptive side blind zone alert system of the host vehicle by determining a width of the warning zone as a function of the minimum distance from the center of gravity of the host vehicle to the centerline extending along the center of the first lane, and determining a length of the warning zone as a function of the width of the warning zone;

detecting a remote vehicle inside the warning zone after determining the warning zone, wherein the remote vehicle is moving in the first lane; and providing an alert in response to detecting that the remote vehicle is inside the warning zone.

2. The method of claim 1, wherein determining the length of the warning zone as a function of the width of the warning zone includes determining the length of the warning zone using a following equation:

$$L = k \times w$$

where:

L is the length of the warning zone;

w is the width of the warning zone; and k is a predetermined scaling factor.

3. The method of claim 2, wherein detecting the remote vehicle inside the warning zone includes using a blind zone sensor to detect the remote vehicle inside the warning zone, the blind zone sensor is an ultrasonic sensor, the blind zone sensor has a maximum range, the length of the warning zone is equal to or less than the maximum range of the blind zone sensor, the width of the warning zone is equal to or less than the maximum range of the blind zone sensor, and the length of the warning zone and the width of the warning zone are constrained by a following equation:

$$\sqrt{w^2 + L^2} \leq \gamma_{max}$$

where:

L is the length of the warning zone;

w is the width of the warning zone; and $\gamma_{max}$ the maximum range of the blind zone sensor.

4. The method of claim 3, wherein determining the warning zone as the function of the minimum distance from the center of gravity of the host vehicle to the centerline of the first lane includes calculating the width of the warning zone using a following equation:

$$w = \frac{d + \frac{1}{2} Veh_{width} + \frac{1}{2} lane_{width}}{\cos \alpha} + \delta$$

where:

δ is a predetermined constant to fine tune the width of the warning zone;

d is the minimum distance from the center of gravity of the host vehicle to the centerline extending along the center of the first lane;

$Veh_{width}$ is a width of the host vehicle;

$lane_{width}$ is a width of the second lane;

α is an angle from centerline extending along the center of the first lane and a centerline extending along a center of the second lane; and w is the width of the warning zone.

5. The method of claim 1, wherein providing the alert includes turning on a light of the host vehicle.

6. The method of claim 1, wherein determining that the host vehicle is approaching the first lane that is nonparallel to the second lane includes:

receiving location data of the host vehicle;

receiving a navigation map of an area surrounding the host vehicle; and determining that the host vehicle is approaching the first lane that is nonparallel to the second lane using the location data of the host vehicle and the navigation map of the area surrounding the host vehicle.

7. The method of claim 1, wherein determining that the host vehicle is approaching the first lane that is nonparallel to the second lane includes:

detecting a traffic pattern that is not parallel to a heading of the host vehicle; and determining that the host vehicle is approaching the first lane that is nonparallel to the second lane in response to detecting the traffic pattern that is not parallel to the heading of the host vehicle.

8. The method of claim 1, wherein determining that the host vehicle is approaching the first lane that is nonparallel to the second lane includes:

receiving a vehicle-to-vehicle (V2V) communication from the remote vehicle, wherein the V2V communication is indicative that the host vehicle is approaching the first lane that is nonparallel to the second lane; and determining that the host vehicle is approaching the first lane that is nonparallel to the second lane in response receiving the V2V communication from the remote vehicle.

9. The method of claim 1, wherein determining that the host vehicle is approaching the first lane that is nonparallel to the second lane includes:

receiving a vehicle-to-infrastructure (V2I) communication from an infrastructure, wherein the V2I communication is indicative that the host vehicle is approaching the first lane that is nonparallel to the second lane; and determining that the host vehicle is approaching the first lane that is nonparallel to the second lane in response receiving the V2I communication from the remote vehicle.

10. A tangible, non-transitory, machine-readable medium, comprising machine-readable instructions, that when executed by a processor, cause the processor to:

determine that a host vehicle is approaching a first lane that is nonparallel to a second lane, wherein the host vehicle is moving in the second lane;

activate an adaptive side blind zone alert system of the host vehicle in response to determining that the host vehicle is approaching the first lane that is nonparallel to the second lane;

determine a minimum distance from a center of gravity of the host vehicle to a centerline extending along a center of the first lane;

determine a warning zone in response to activating the adaptive side blind zone alert system of the host vehicle by determining a width of the warning zone as a function of the minimum distance from the center of gravity of the host vehicle to the centerline extending along the center of the first lane, and determining a length of the warning zone as a function of the width of the warning zone;
detect a remote vehicle inside the warning zone after determining the warning zone, wherein the remote vehicle is moving in the first lane; and
provide an alert to a vehicle user of the host vehicle in response to detecting that the remote vehicle is inside the warning zone.

11. The tangible, non-transitory, machine-readable medium of claim 10, wherein the tangible, non-transitory, machine-readable medium, further comprising machine-readable instructions, that when executed by the processor, causes the processor to:
determine the length of the warning zone using a following equation:

$$L = k \times w$$

where:
L is the length of the warning zone;
w is the width of the warning zone; and
k is a predetermined scaling factor.

12. The tangible, non-transitory, machine-readable medium of claim 11, wherein the tangible, non-transitory, machine-readable medium, further comprising machine-readable instructions, that when executed by the processor, causes the processor to:
detect that the remote vehicle is inside the warning zone using a blind zone sensor, wherein the blind zone sensor is an ultrasonic sensor, the blind zone sensor has a maximum range, the length of the warning zone is equal to or less than the maximum range of the blind zone sensor, the width of the warning zone is equal to or less than the maximum range of the blind zone sensor, and the length of the warning zone and the width of the warning zone are constrained by a following equation:

$$\sqrt{w^2 + L^2} \leq \gamma_{max}$$

where:
L is the length of the warning zone;
w is the width of the warning zone; and
$\gamma_{max}$ the maximum range of the blind zone sensor.

13. The tangible, non-transitory, machine-readable medium of claim 12, wherein the tangible, non-transitory, machine-readable medium, further comprising machine-readable instructions, that when executed by the processor, causes the processor to:
calculate the width of the warning zone using a following equation:

$$w = \frac{d + \frac{1}{2} Veh_{width} + \frac{1}{2} lane_{width}}{\cos \alpha} + \delta$$

where:
$\delta$ is a predetermined constant to fine tune the width of the warning zone;
d is the minimum distance from the center of gravity of the host vehicle to the centerline extending along the center of the first lane;
$Veh_{width}$ is a width of the host vehicle;
$lane_{width}$ is a width of the second lane;
$\alpha$ is an angle from centerline extending along the center of the first lane and a centerline extending along a center of the second lane; and
w is the width of the warning zone.

14. The tangible, non-transitory, machine-readable medium of claim 10, wherein the tangible, non-transitory, machine-readable medium, further comprising machine-readable instructions, that when executed by the processor, causes the processor to:
command a light of the host vehicle to turn on to provide the alert.

15. The tangible, non-transitory, machine-readable medium of claim 10, wherein the tangible, non-transitory, machine-readable medium, further comprising machine-readable instructions, that when executed by the processor, causes the processor to:
receive location data of the host vehicle;
receive a navigation map of an area surrounding the host vehicle; and
determine that the host vehicle is approaching the first lane that is nonparallel to the second lane using the location data of the host vehicle and the navigation map of the area surrounding the host vehicle.

16. The tangible, non-transitory, machine-readable medium of claim 10, wherein the tangible, non-transitory, machine-readable medium, further comprising machine-readable instructions, that when executed by the processor, causes the processor to:
detect a traffic pattern that is not parallel to a heading of the host vehicle; and
determine that the host vehicle is approaching the first lane that is nonparallel to the second lane in response to detecting the traffic pattern that is not parallel to the heading of the host vehicle.

17. The tangible, non-transitory, machine-readable medium of claim 10, wherein the tangible, non-transitory, machine-readable medium, further comprising machine-readable instructions, that when executed by the processor, causes the processor to:
receive a vehicle-to-vehicle (V2V) communication from the remote vehicle, wherein the V2V communication is indicative that the host vehicle is approaching the first lane that is nonparallel to the second lane; and
determine that the host vehicle is approaching the first lane that is nonparallel to the second lane in response receiving the V2V communication from the remote vehicle.

18. The tangible, non-transitory, machine-readable medium of claim 10, wherein the tangible, non-transitory, machine-readable medium, further comprising machine-readable instructions, that when executed by the processor, causes the processor to:
receive a vehicle-to-infrastructure (V2I) communication from an infrastructure, wherein the V2I communication is indicative that the host vehicle is approaching the first lane that is nonparallel to the second lane; and
determine that the host vehicle is approaching the first lane that is nonparallel to the second lane in response receiving the V2I communication from the remote vehicle.

* * * * *